United States Patent
Petersen

[11] 3,718,033
[45] Feb. 27, 1973

[54] TESTING APPARATUS UTILIZING POSITION-FORCE CROSS COUPLING CONTROL

[75] Inventor: Niel R. Petersen, Hopkins, Minn.

[73] Assignee: MTS Systems Corporation, Minneapolis, Minn.

[22] Filed: April 20, 1971

[21] Appl. No.: 135,560

[52] U.S. Cl. .................................. 73/71.7, 73/88 R
[51] Int. Cl. ............................................. G01n 3/32
[58] Field of Search .................... 73/88 R, 71.7, 71.5

[56] References Cited

UNITED STATES PATENTS 2,799,158  7/1957  Federspiel ............................. 73/11

*Primary Examiner*—Jerry W. Myracle
*Attorney*—Dugger, Peterson, Johnson & Westman

[57] ABSTRACT

Where a specimen, such as a wheel spindle of an automobile, is acted on by a first actuator to position the spindle along a vertical axis and a second actuator to apply a force or load along a horizontal axis, both of which actuators are pivotally mounted, cross coupling errors arise because the load being applied by the second actuator is influenced by the displacement produced by the first actuator. Compensation therefor is provided by multiplying a first signal representative of the change in horizontal displacement with respect to vertical displacement by a second signal representative of the vertical velocity of the specimen or the time rate of change of the vertical displacement thereof, the resulting product signal being employed in modifying the control of the horizontal actuator to provide the proper compensation.

7 Claims, 1 Drawing Figure

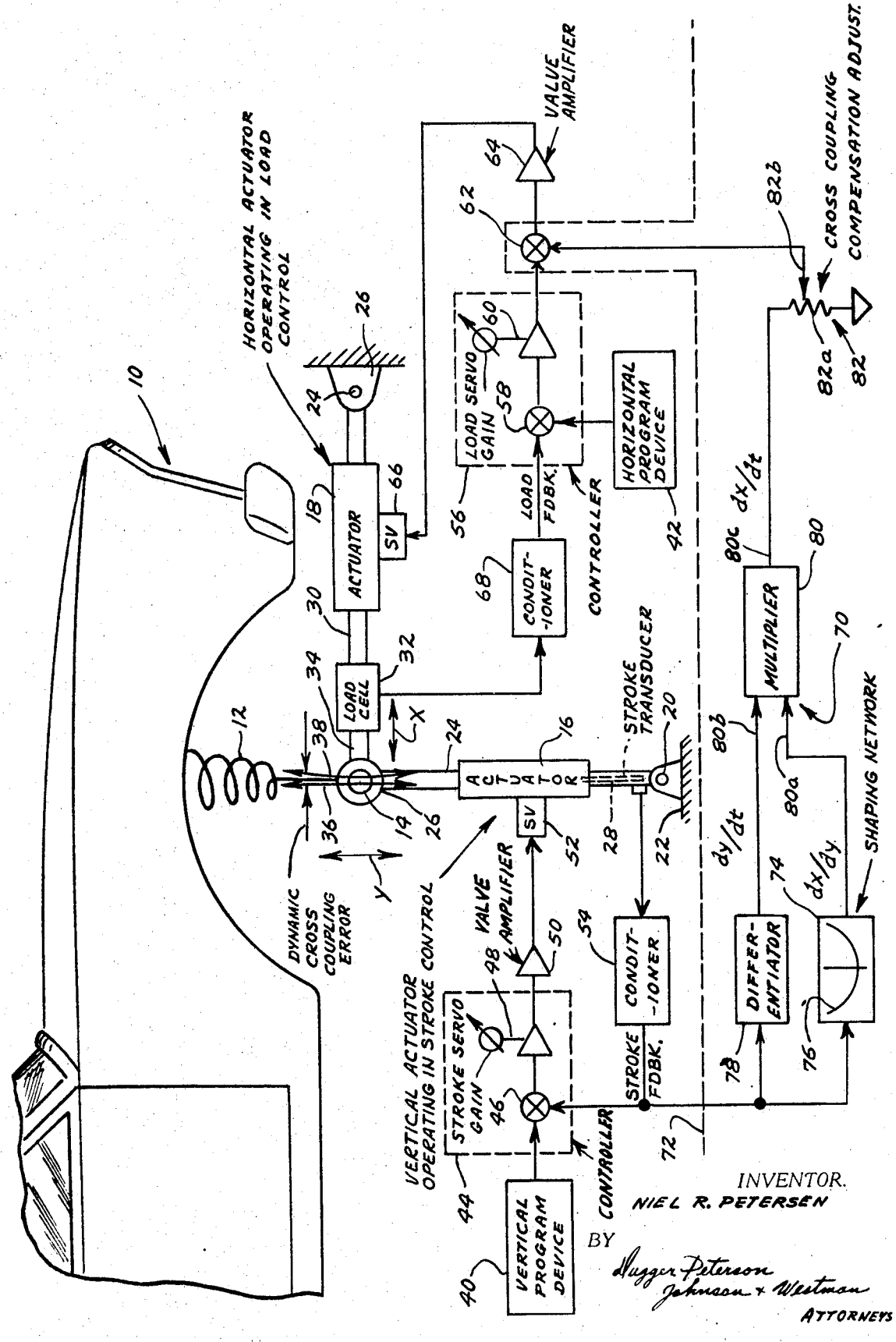

TESTING APPARATUS UTILIZING POSITION-FORCE CROSS COUPLING CONTROL

BACKGROUND OF THE INVENTION

1. Field of the Invention

The present invention relates generally to testing apparatus for simulating prescribed movements, and pertains more particularly to a system for use in compensating for cross coupling errors.

2. Description of the Prior Art

Cross coupling errors have proved particularly troublesome in simulating road conditions experienced by automobile wheel spindles in that such spindles traverse arcuate paths. Consequently, when a first actuator operating in position control positions the spindle vertically, a disturbing motion is imposed by the spindle on a second or horizontally disposed actuator operating in load control. Complex mechanical linkages have been devised to minimize the cross coupling effects. In this regard, patent application Ser. No. 105,401 filed on Jan. 11, 1971 in the name of Thomas P. Lentz for AXLE TEST DEVICE and which has been assigned to the present assignee. The alluded to application has greatly simplified the mechanical arrangements heretofore resorted to, doing so with bell cranks. The present applicant in no way wishes to disparage the invention described in the above-mentioned application. The present invention involves an electrical solution for the cross coupling problem which possesses certain cost and flexibility advantages over the bell crank system or further enhances the overall fixture system performance.

SUMMARY OF THE INVENTION

Accordingly, a general object of the present invention is to provide a simple and inexpensive control system for minimizing the load cross coupling errors that have in the past been experienced when a common reaction point follows either a linear or nonlinear path.

A more specific object is to reproduce the correct load and stroke waveforms required at a common tie point. In this regard, an aim of the invention is to utilize the feedback signals provided by the system or other control media, altering one such signal with respect to the other so that the testing closely approximates the command intelligence embodied in both the control systems.

Yet another object of the invention is to provide a total servo control system for two or more actuators which apply forces along at least two different axes so that the actuator contained in the one servo control channel will be able to compensate for the disturbances caused by another control channel.

Briefly, the invention comprises two (or more) actuators, one disposed vertically and the other (or others) horizontally, which act on a common reaction point, such as the wheel spindle of an automobile. The vertical actuator exercises a position control function and the horizontal actuator (or actuators) perform a load control function. A bias signal is added into the load control servoloop that will force this slower channel to keep up with and reproduce the desired loads that are to be applied to the spindle without adverse cross coupling effects. A multiplier accepts a first input signal derived from either a linear or nonlinear, as the case may be, shaping network which denotes the change in horizontal displacement or movement with respect to the vertical displacement or movement. The first signal is multiplied by a second signal indicative of the vertical displacement with respect to time, that is vertical velocity, of the spindle. The product or output signal from the multiplier is in this way made representative of the horizontal velocity that is required to impart the proper movement along both the vertical and horizontal axes so that a more accurate simulation results.

BRIEF DESCRIPTION OF THE DRAWING

The sole FIGURE denotes testing apparatus for simulating road movements experienced by a wheel spindle with my control system diagrammatically superimposed thereon.

DESCRIPTION OF THE PREFERRED EMBODIMENT

Although my invention can be used in other applications, it will find especial utility in the testing of automobile wheel spindles and therefore this type of testing has been schematically portrayed in the accompanying drawing. Inasmuch as the test specimen constitutes the wheel spindle of a conventional front-wheel suspension system of an automobile in the illustrative situation, the suspension system need not be depicted in any detail. With this in mind a fragmentary portion of an automobile 10 has been illustrated having a suspension system exemplified only by a simple coil spring 12. The spindle itself has been given the reference numeral 14, the spindle being an integral part of the suspension system 12.

In order to apply forces simulating a given set of road conditions, a pair of actuators 16, 18 are employed. MTS Systems Corporation of Minneapolis, Minn., the assignee of the invention herein described, manufactures an appropriate actuator under Model No. MTS Cylinder Series 204. It will be discerned, however, that one actuator 16 is pivotally mounted at 20 to a fixed surface 22, such as the floor of a test cell or the base plate of the test equipment. Somewhat similarly, the second actuator 18 is pivotally attached at 24 to a fixed vertical surface 26, such as the wall of the test cell or a vertical panel associated with the testing equipment. It will be appreciated that the pivotal connections 20, 22 allow the actuators 16, 18 to swivel to the extent needed in applying the requisite forces to the spindle 14. The actuator 16 has its projecting piston rod 24 formed with a bearing 26 that encircles the spindle 14. Inasmuch as the actuator 16 performs a stroke-producing function, that is, it positions the spindle 14 vertically, use is made of an internally mounted displacement transducer 28, such as a linear differential transformer having a core movable within stationary exciting and pickup coils contained within the housing of the vertical actuator 16. The displacement transducer (LVDT) is easily mounted inside the housing of an actuator having the above-mentioned MTS model designation, and since this combination is commercially available, it should suffice to merely state that the transducer 28 provides a signal proportional to the stroke of the piston rod 24 and hence in accordance with the position or displacement of the wheel spindle 14, which is the test specimen in the illustrative case, along a first or vertical axis.

Since the function of the actuator 18 is to apply the proper load or force to the spindle 14 along a second or horizontal axis, its piston rod 30 is adapted for connection to a load cell 32. Associated with the load cell is a bearing 34 that encircles the spindle 14 in the same manner as the bearing 26.

It may be of some benefit to apply a straight arrow 36 indicative of the direction in which the spindle displacement should occur vertically, and a curved arrow 38 representing the actual displacement that results due to the constraint imposed by the actuator 18. More specifically, it will be recognized that the swiveling caused by the pivoting of the actuator 18 at 24 prevents a linear travel or stroke in the direction of the arrow 36 without some positional adjustment. The amount of vertical displacement in the direction of the arrow 36, which is generally tangential to the arcuate path denoted by the arrow 38, will be indicated by the letter $y$ and later referred to by this designation, whereas the displacement in the horizontal direction, which is generally radial or normal to the path 38, will be represented by the letter $x$. It should be appreciated at this stage of the description that the difference between the position or location of the spindle 14 at a point on the arcuate path 38 at a given moment and a point on the linear path 36 is indicative of the cross coupling error. This is a dynamic condition and this disturbance continually affects the dynamic load being applied by the actuator 18. The present invention, however, continually corrects or compensates for this error as will soon become manifest.

Inasmuch as a two-channel command, one for position control and the second for load control, has been selected to exemplify the invention, it follows that two command signals are needed. Therefore, first and second program devices 40 and 42, which can be in the form of tape recorders, provide the proper command signals, the device 40 supplying the vertical program and the device 42 the horizontal program. Since in the exemplary arrangement the spindle 14 is to be moved vertically, the stored signals furnished by the device 40 are such as to cause the desired positioning of the spindle 14 along a vertical axis, whereas the signals supplied by the device 42 cause the desired force or load to be applied along a horizontal axis. As already explained, though, the vertical displacement of the spindle 14 changes the actual loading so that it does not correspond to the desired or commanded dynamic loading; the present invention, however, corrects for this.

As far as the program device 40 is concerned, this being the one that is to supply the vertical control signals, the signals therefrom are delivered to a conventional controller 44 comprising a summing junction or comparator 46 and a servo gain control 48 which connects with the input of a valve amplifier 50. The output from the valve amplifier 50 is delivered to a flow control servovalve 52 for supplying fluid to the actuator 16. A feedback conditioner 54 has its input connected to the transducer 28 and its output to the second input of the summing junction or comparator 46, the first input of the comparator 46 being connected to the vertical program device 40. In this way, as is conventional, any deviation between the command signal called for by the vertical program device 40 and the feedback signal from the conditioner 54 appears as an error signal at the output of the comparator 46 and is used to control the servovalve 52 which in turn controls the vertical actuator 16.

A second controller 56 contains a summing junction or comparator 58 and a load servo gain control 60 which is connected through a summing junction or comparator 62 and a valve amplifier 64 to a flow control servovalve 66 associated with the actuator 18. A feedback signal is sent from the load cell 32 to the second input of the summing junction or comparator 58 over a line containing a feedback conditioner 68, the command signal supplied by the horizontal program device 42 being applied to the other input of the summing junction or comparator 58.

What has been described up to this point with the exception of the comparator 62 constitutes testing equipment that is conventional. It will be appreciated, though, that the vertical actuator 16 is included in the position control channel and the horizontal actuator 18 in the load control channel. The common tie point represented by the spindle 14 traverses an arcuate path as denoted by the arrow 38. While the test specimen has been designated as the spindle 14, it will be recognized that this connection could constitute any two degree-of-freedom system, the wheel spindle 14 being only an example of such a system. Hence, if the program device 40 produces a signal requiring a given amount of vertical displacement to vertically position the spindle 14, and the horizontal program device 42 provides a signal that represents the amount of force or load that should be applied horizontally, then the two forces applied via the bearings 26 and 34 to the spindle 14 will be interassociated.

As far as the specific test specimen in this illustrative situation is concerned, it will be recognized that the vertical displacement $y$ will be considerably larger than the resulting horizontal displacement $x$. This is so by reason of the fact that the displacement $y$ is indicative of the actual bumps experienced in the simulated road test, whereas the displacement $x$ is caused only by the arcuate constraint resulting from the pivotal mounting at 24 of the actuator 18. It is desired, however, that a load indicative of horizontal forces picked up from the road be applied to the spindle 14 by the actuator 18.

Hence, under dynamic conditions, the load control channel involving the actuator 18 cannot keep pace with the position control channel which includes the actuator 16. Therefore, a load error occurs due to the cross coupling effect. An aim of the invention is, of course, to provide an effective, yet simple, solution to this vexing problem. Therefore, it may be helpful at this stage to algebraically denote the correction that is desired. In this regard, the desired correction is the velocity of the horizontal actuator 18 that is required in order to follow the movement produced by vertical actuator 16. This velocity, however, is interdependent upon the vertical position and velocity. Therefore, the situation can be algebraically presented as follows:

$$dx/dt = dx/dy \cdot dy/dt$$

where $dx/dt$ equals horizontal velocity and
where $dx/dy \cdot dy/dt$ equals angle compensation times vertical velocity.

Having given the foregoing information, it is believed that my control system denoted generally by the reference numeral 70 will be better understood. From the drawing it will be seen that this system comprises those components appearing below the dashed line labeled 72; the system 70 includes the summing junction or comparator 62 which has already been referred to. The control system 70 additionally includes a nonlinear shaping network 74 having its input connected directly to the output side of the feedback conditioner 54 and therefore delivers into the network 74 a signal representing the vertical motion or displacement $y$. Consequently, the output signal from the network 74 is representative of the rate of change as far as the horizontal displacement $x$ is concerned with respect to the vertical displacement $y$, even though realized from a simple potentiometer.

Where the horizontal displacement $x$ is substantially proportional to the vertical displacement $y$, then the network 74 may constitute only a simple potentiometer with the wiper arm being set so as to produce an output representative of $dx/dy$ on a proportional basis. Frequently, though, the relationship between $x$ and $y$ can become quite complex. Therefore, it will be well to place a nonlinear curve 76 within the block designating the nonlinear shaping network 74. The hardware within the block 74 will thus be designed so as to represent, either precisely or proximally, the particular nonlinear relation that prevails for a given test. Stated somewhat differently, the benefits to be derived from a practicing of my invention can be readily understood irrespective of the content or design of the network 74.

My control system 70 further includes a differentiator 78 having its input also connected to the feedback amplifier 54 so that it likewise receives a signal indicative of the amount of vertical displacement $y$. As its name implies, it differentiates this signal on a time basis so that the signal at its output is representative of vertical velocity, more specifically the change in the vertical displacement $y$ with respect to time.

Reference will now be made to a multiplier 80 having first and second inputs 80a, 80b and an output 80c. The multiplier 80 may be a multiplier manufactured by Motorola Semiconductor Products Inc. which carries the model designation MC 1595. The multiplier 80 multiplies its two input signals (which are the output signals from the network 74 and differentiator 78) together and the product or output signal from the output 80c, this being a signal having a value corresponding to the horizontal velocity, is made available as a corrective signal for the summing junction or comparator 62. However, it will be desirable to adjust the magnitude of the cross coupling compensation and this is done through the agency of a potentiometer 82, the output 80c being connected to the resistance 82a and its wiper arm 82b being connected to the second input terminal of the summing junction or comparator 62. The feedback signal from the amplifier 68 being applied to the first input of the comparator 62.

OPERATION

Although the operation is believed obvious from the detailed description that has already been presented, nonetheless a brief summary may be of assistance. In this regard, it will be appreciated that the spindle 14 traverses the arcuate path represented by the arrow 38. The vertical displacement or motion produced by the actuator 16 when operating in this manner would influence the force applied by the actuator 18. The signal delivered to the actuator 18 is modified so as to take into consideration the vertical position of the spindle 14 at any moment, changing the actual applied load accordingly.

Consequently, as the actuator 16 moves the spindle 14 upwardly, this motion being denoted by the arrow 36 (and the letter $y$), a signal in accordance therewith is provided by the transducer 28 and delivered to the input of the shaping network 74. In the exemplary situation the network 74 may constitute a potentiometer, as already explained, and owing to the substantial proportional variation of $x$ with respect to $y$, as can be discerned from the arrows 36 and 38, more specifically, the divergence of the arrow 38 with respect to the arrow 36, it follows that the network 74 provides an output signal which is representative of the change in the horizontal displacement $x$ with respect to the vertical displacement $y$.

Simultaneously, the differentiator 78 provides a signal representing the change in the vertical displacement $y$ with respect to time, that is velocity. By multiplying these two signals together with the multiplier 80, an output signal which is the product of the two input signals is provided, containing information which represents the change in the horizontal displacement $x$ with respect to time. This signal is inputted to the summing junction 62 and is thus algebraically combined with the signal furnished by the conditioner 56.

Consequently, the horizontal program signal from the device 42 is modified by reason of the product signal from the multiplier 80 (and also by the setting of the wiper arm 82b of the potentiometer 82) to reflect the change in the signal delivered to the flow control servovalve 66. The resulting load or force applied to the spindle 14 by the actuator 18 is closely representative of the load that should be applied. The applied load, in this way, is not adversely affected by the cross coupling that would otherwise develop owing to the change in elevational position of the specimen 14.

It will be recognized that the entire system 70 is exceedingly simple and that it can be manufactured quite inexpensively. The effect of the external disturbance on the load control loop, which includes the actuator 18, the load cell 32, the feedback amplifier 68 and the conditioner 56, is minimized by merely generating a signal proportional to the necessary horizontal velocity. This is achieved by using a velocity signal as one input to the multiplier 80. Thus, as far as simulating road conditions in the testing of automobiles, the use of expensive mechanical linkages is avoided, an electrical analogue of such linkages being provided instead to accurately duplicate what the mechanical linkages have had to do in the past. This is achieved by incorporating signals from both the load and stroke control to produce the necessary velocity in the load control loop.

I claim:

1. A position-force cross coupling control system for a test specimen mounted for movement in at least one axis and mounted to receive a load application in a different axis, including means to move said specimen along said one axis and means to apply a load to the specimen along said different axis, the control system comprising means providing a first signal representative of the displacement of the specimen along said different axis with respect to its displacement along said one axis, means providing a second signal representative of the displacement of said specimen with respect to time along said one axis, means for multiplying said first and second signals together to provide a product signal, and means connected to said multiplying means for modifying the load applied to said specimen in accordance with said product signal to compensate for changes in the load being applied due to the position of the specimen along said one axis.

2. Testing apparatus comprising first actuating means for moving a test specimen along a first axis, second actuating means for applying a load along a second axis at an angle to said first axis, means providing a first signal representative of the displacement of the specimen along said second axis with respect to its displacement along said first axis, means providing a second signal representative of the velocity of said specimen along said first axis, a multiplier for multiplying said first and second signals together to provide a product signal, and means connected between said multiplier and said second actuating means for controlling said second actuating means in accordance with the value of said product signal to adjust the magnitude of the load being applied to compensate for movement of said specimen along said first axis.

3. Test apparatus for providing a position control along a first axis and a load control along a second axis with respect to specimen having a common reaction point comprising means to move said specimen along said first axis and means to load the specimen along the second axis, first means providing a signal representative of the amount of movement along the first axis, second means providing a signal representative of the amount of load applied along the second axis, a shaping network connected to said first means for providing a first signal representative of the rate of change of the displacement of said second means with respect to said first means, a differentiator connected to said first means for providing a second output signal representing the amount of displacement along said first axis with respect to time, multiplying means for multiplying said first and second signals together to provide a product signal representing the rate of change of the displacement along said second axis with respect to time, and means for providing a control signal for said means to load said specimen which contains therein command information provided by said product signal and the signal from said second means.

4. Test apparatus as defined in claim 3 in which a wheel spindle provides said common reaction point, said apparatus including a first pivotally mounted actuator for moving the spindle along the first axis, said means providing a signal representative of the amount of movement along the first axis including a transducer connected to said shaping network and to said differentiator, a first program device for producing a signal indicative of said spindle along said first axis, means for comparing the signal from said first program device with the signal from said transducer, said means providing a signal representative of the amount of load applied along the second axis including a load cell, a second program device for producing a signal indicative of a desired load to be applied to said specimen along said second axis, said means for providing a control signal for said means to load said specimen including a summing junction having first and second inputs and an output, said first input being connected to said load cell and said second input to said multiplying means whereby the signal from said second program device is modified by said product signal to change the control signal for said means to load said specimen to compensate for the change of position of said spindle along said first axis.

5. Test apparatus as defined in claim 4 including a cross coupling compensation adjusting means connected between said multiplying means and said summing junction.

6. A position-force cross coupling control system for a test specimen mounted for movement under load along a first axis including means for moving said specimen under load along said first axis, means comprising pivotally mounted extendable and retractable load actuator coupled to the specimen on a coupling pivot for applying load to the specimen along a second axis at an angle to said first axis and which actuator normally moves in an arc as the specimen moves along the first axis, the control system comprising means providing a first signal representative of the displacement of said coupling pivot along said second axis with respect to its displacement along said first axis, means providing a second signal representative of the displacement of said specimen with respect to time along said first axis, means for multiplying said first and second signals together to provide a product signal, and means connected to the multiplying means to modify the length of the actuator to compensate for displacement of the specimen along said first axis without substantially changing the load applied to the specimen by said actuator along said second axis.

7. The combination as specified in claim 6 wherein said actuator comprises a hydraulic actuator, and wherein said means connected to the multiplying means to modify the length of the actuator includes control means for controlling the load applied by said actuator, signal means for determining the load applied by said actuator along said second axis, said means connected to the multiplying means also being connected to said signal means.

* * * * *